(12) United States Patent
Piquemal (10) Patent No.: US 8,448,668 B2
(45) Date of Patent: May 28, 2013

(54) DEVICE FOR DAMPING PRESSURE VARIATIONS IN A SEALED CHAMBER

(75) Inventor: Alain Piquemal, Villequier (FR)

(73) Assignee: Total Raffinage Marketing, Puteaux (FR)

(*) Notice: Subject to any disclaimer, the term of this patent is extended or adjusted under 35 U.S.C. 154(b) by 92 days.

(21) Appl. No.: 13/142,785

(22) PCT Filed: Dec. 31, 2009

(86) PCT No.: PCT/FR2009/052723
§ 371 (c)(1),
(2), (4) Date: Sep. 27, 2011

(87) PCT Pub. No.: WO2010/076544
PCT Pub. Date: Jul. 8, 2010

(65) Prior Publication Data
US 2012/0012216 A1    Jan. 19, 2012

(30) Foreign Application Priority Data
Dec. 31, 2008  (FR) ..................................... 08 59162

(51) Int. Cl.
*F16L 55/04* (2006.01)
(52) U.S. Cl.
USPC ............... 138/26; 138/31; 138/46; 137/550
(58) Field of Classification Search
USPC .................. 138/26, 30, 31, 45, 46; 137/550, 137/468; 261/114.4, 114.5
See application file for complete search history.

(56) References Cited

U.S. PATENT DOCUMENTS

| 2,045,518 | A |   | 6/1936  | Chatfield |
|-----------|---|---|---------|-----------|
| 2,105,501 | A |   | 1/1938  | Parsons |
| 3,105,862 | A | * | 10/1963 | Doering, Jr. ............... 261/114.1 |
| 4,133,852 | A |   | 1/1979  | DiNicolantonio et al. |
| 4,181,611 | A | * | 1/1980  | Rubenstein et al. .......... 210/149 |
| 5,816,291 | A | * | 10/1998 | Johannesson .................... 138/30 |
| 7,370,675 | B2 | * | 5/2008 | Cancade et al. ................. 138/45 |
| 8,167,002 | B2 | * | 5/2012 | Kuhne et al. .................... 138/45 |

FOREIGN PATENT DOCUMENTS

| DE | 1981672 U       | 3/1968  |
| DE | 4304649 A1      | 9/1994  |
| DE | 102004015008 A1 | 10/2005 |
| FR | 2364049 A       | 4/1978  |

* cited by examiner

Primary Examiner — Patrick F Brinson
(74) Attorney, Agent, or Firm — Sughrue Mion, PLLC (57) ABSTRACT

The present invention relates to a device (1) for damping pressure variations in a sealed chamber, including: a flat element (4) held stationary in the sealed chamber and perforated with at least one opening (10); at least one flat mobile element (3) arranged, in normal operation, in the same shared plane as the element held stationary in the chamber so as to cover the opening of the element which is held stationary, said mobile flat element being suitable for separating from the opening in the direction of the top or the bottom of the chamber, the dimensions of said element which is held stationary being at least equal to those of the opening for the element which is held stationary, preferably equal to those of said opening; at least one joining member (7) rigidly connecting the mobile element to the element which is held stationary and enabling the flat mobile element to be held, separated or returned relative to the opening of the element which is held stationary, in particular said joining member comprising a rod (8) surrounded by at least one torsion or compression spring (9), as well as use of the device.

19 Claims, 4 Drawing Sheets

DEVICE FOR DAMPING PRESSURE VARIATIONS IN A SEALED CHAMBER

CROSS REFERENCE TO RELATED APPLICATIONS

This application is a National Stage of International Application No. PCT/FR2009/052723, filed Dec. 31, 2009, which claims priority from French Patent Application No. 08 59162, filed Dec. 31, 2008, the contents of all of which are incorporated herein by reference in their entirety.

The present invention relates to the field of sealed chambers in which pressure variations can occur.

The invention proposes a novel device capable of damping and even dissipating a pressure variation, in particular a sudden one, occurring in a sealed chamber in order to prevent damage to said chamber and/or some of its constituent elements.

More particularly, the invention relates to the field of fractionating columns fed with liquid or gaseous fluids forming different phases and circulating in countercurrent flow. The invention proposes to equip trays which ensure the contact between the fluids with a novel device capable of diminishing and even preventing the deformation of said trays following a pressure variation, preferably an elevated pressure.

In what follows and within the sense of the invention, the expression "pressure variation" is understood to mean a positive or negative difference in pressure exerted between the faces of a plane element or tray, i.e. any elevated or reduced pressure caused by a fluid, preferably a gas, or by the instantaneous vaporization of a liquid fluid. The object of the invention is thus to damp and/or dissipate said pressure variation.

Unless otherwise indicated, the expression "between a value X and a value Y" means a range which includes the limits X and Y. Lastly, in the present application, the spatial notions "upper" and "lower" should be situated respectively relative to the top and the bottom of the chamber.

Reactors used for fractionating operations such as distillation, stripping, liquid/gas absorption or alternatively liquid/liquid extraction are as a rule equipped with perforated trays. The latter can be spaced apart from one another by 30 to 130 cm, more particularly by 30 to 80 cm, or even by 30 to 65 cm.

The function of these trays can be to promote contact between the rising phase, such as vapor or the lightest phase in the case of liquid/liquid extraction, and the falling phase, the heaviest liquid phase.

Each of these trays can be obtained by assembling multiple plane elements termed "tray elements" which have geometries and dimensions such that each element can be introduced through a "manhole", also termed "inspection door", with a width or small dimension between 30 and 50 cm, or even 30 to 40 cm. The tray elements can be assembled by bolting or clip-fastening.

These tray elements are manufactured from any material capable of resisting the extreme temperature and pressure conditions of a reactor, such as metals and alloys, for example steel, stainless steel, ferritic, austenitic or martensitic stainless steel, nickel alloys, copper alloys, titanium or alternatively zirconium.

During operation, the heaviest liquid phase distributed at the top of the column falls under gravity from one tray to another via the overflow. This means for allowing the liquid to fall down consists of an outlet weir which serves to ensure, on each tray, a more or less constant level of the liquid at a small depth (3 to 8 cm). In the opposite direction, the lightest phase (gas or liquid) rises in a countercurrent flow from the base of the column and mixes at the layer of liquid held on the tray.

The trays hence have the function of promoting contact between the lightest rising phase and the heaviest falling phase. Each tray is thus the point where the two different phases of fluids arrive, where these phases are mixed and where the new phases obtained are then separated off.

A crucial step in the process is the bringing of the two phases into contact. In order to effect this contact, the tray has bubbling elements. These elements can simply consist of orifices in the tray, a perforated tray, be provided with caps, a cap tray, or alternatively be provided with valves, a valve tray:

- A perforated tray controls the flow of liquid with the aid of outlet weirs whilst the vapor rises through simple perforations 3 to 25 mm in diameter. In spite of the simplicity of its manufacture, this tray is not widely used in industry. It does in fact lack flexibility in terms of the flow rates. In particular, a low vapor flow rate generates a weeping phenomenon and has a high likelihood of dirt accumulating in the small-diameter perforations.
- A cap tray is equipped with orifices surmounted by shafts, each of which are topped by a cap. The light phase coming from the lower tray is channeled through each shaft and then escapes through the lateral slits in the caps toward the liquid held on the tray. Despite being extremely flexible, even at very low flow rates, and having good contact performance, cap trays are not widely used because of their complex production method and their price.
- A valve tray is equipped with orifices surmounted by valves which can move vertically. The height by which a valve can lift up is a function of the flow rate of the lightest phase which escapes horizontally into the liquid held on the tray. The porosity of the tray is thus linked to the operating conditions and the valves, which remain closed when the vapor flow rate is low, oppose the falling of the heaviest phase and its flow into the orifices, thus limiting the weeping phenomenon. In the case of systems which can give rise to the accumulation of dirt, the valves used are fixed and thus cannot become stuck to the tray. The disadvantage of this arrangement is that a weeping phenomenon occurs at a low flow rate since the valves cannot close.

Whatever their arrangement in the column, the trays can be weakened or damaged by the extreme pressure and temperature conditions to which they are subjected. In particular, the trays can be damaged following the instantaneous vaporization of water, even if the latter is present only in a very small quantity in the liquid charge fed in or inside the column. Thus, as described in the patent FR 2 364 049, the instantaneous vaporization of 10 dm$^3$ of water can cause a differential pressure of 0.10 to 0.20 kg/cm$^2$ between the two sides of each of the conventional fractionating trays which are stacked vertically in the tower.

Such sudden increases in pressure can then arch the trays toward the top of the column and/or tilt them, thereby reducing the fractionating capacity of the column.

With the aim of overcoming these disadvantages, the patent FR 2 364 049 describes a decompression tray comprising at least one section articulated at one end and the opposite end of which can pivot freely upwards to dissipate the sudden changes in pressure resulting from the instantaneous vaporization of water or the accumulation of gas in the column. Once the elevated pressure has been dissipated and under the effect of a counterweight, the movable section returns to its normal position juxtaposed with the fixed sections of the tray. The mass of the counterweight is 20 to 25 kg so as to create a restoring moment more than 50% of that created by the pressure drop of the vapor as it passes through the tray and which would be capable of lifting up the latter under normal operating conditions.

These "explosion traps" therefore make it possible to increase the passage area of the vapor and dissipate the elevated pressure force. Because the trays of fractionating columns tend to coke up, they are usually equipped with such a device. Although these explosion traps are undoubtedly of interest, they do have major disadvantages which limit their use, such as a high cost, the addition of a significant overweight to the tray and to the support structure, or also a reduced number of valves on the tray and hence a reduced active surface area.

Owing to these disadvantages, many fractionating towers do not have explosion traps, which means that the risk of damage to the trays linked to sudden pressure variations still exists. Such was the case when a vacuum distillation column was started up, during which damage to many valve trays was noted. This incident consequently necessitated the shutting down of the unit for several days so that the necessary repairs could be made. In this specific case, the plane elements of the trays and the supporting beams were arched toward the bottom of the column with an increasing gradient of deformation from the uppermost tray to the lowermost tray.

Without wishing to be bound by this theory, the phenomenon can be explained as follows.

Analysis of the problem has shown that the deformed trays frequently corresponded to those situated directly above a deck for spraying a washing liquid known as "wash oil".

The function of this spray deck fitted with nozzles is to continuously wash the layer of structured packing elements which is situated below in order to limit the build-up of coke on these elements. On start-up, this washing is ensured by a mixture of flux corresponding to a fluid light fraction of petroleum product, used to reduce the viscosity.

Under the effect of the extreme temperature (T) and pressure (P) conditions of the column ($100°$ C.$\leq$T$\leq$450° C. and P<1 bar in the case of vacuum distillation), water which happens to be present at this stage is vaporized instantly or virtually instantly. The vapor so generated is propagated and rises toward the top of the column.

Owing to the direction in which they open and their designed flow rate, the valves allowed the passage of the majority of the elevated pressure without any deformation of the trays toward the top of the column. The arching of the trays with an inverted concavity (toward the bottom of the column) is thus probably the result of the residual gaseous flow, which the valves have not been able to dissipate, being reflected onto the unperforated zones of the tray immediately above. This falling wave of gas then met the lower tray which is made completely leaktight by the closing of the valves, thus causing it to be deformed toward the bottom of the column. This hypothesis of back rush of vapor was also put forward in the article "Use Heavy-Duty Trays for Severe Services" published in August 1995 in the magazine "Chemical Engineering Progress".

In order to avoid this phenomenon, it is recommended to use perforated trays rather than valve trays. However, this solution is unsatisfactory with regard to the unsatisfactory performance of the perforated trays.

The object of the present invention is to solve all or some of the problems encountered in the prior art, particularly those mentioned above. Another object is to improve the reliability, strength, life expectancy and/or affordability of the devices in which it is arranged, whilst being easy to implement and/or inexpensive.

The aim of the invention is thus more particularly to prevent premature shutdowns of installations to carry out repairs as all shutdowns have a considerable financial impact.

To do this, the invention proposes a novel device capable of damping, or even dissipating, any differential pressure exerted between the faces of a plane element in a sealed chamber, it being possible for this pressure variation to cause the deformation of the internal constituent elements of said sealed chamber. The sealed chamber is preferably a fractionating column.

According to a first aspect, the subject of the invention is a device for damping or even dissipating pressure variations in a sealed chamber comprising:
- a fixedly held plane element in the sealed chamber and perforated by at least one orifice;
- at least one movable plane element arranged, during normal operation, in the same common plane as the fixedly held element of the chamber so as to cover the orifice of the fixedly held element, it being possible for the movable plane element to be spaced apart from the orifice of the fixedly held element toward the top or toward the bottom of the chamber, and in particular the dimensions of said movable plane element being at least equal to those of the orifice of the fixedly held element, and preferably equal to those of said orifice;
- at least one joining member which makes the movable element integral with the fixedly held element and allows the movable plane element to be held in place, spaced apart or returned relative to the orifice of the fixedly held element, and in particular said joining member has a rod surrounded by at least one torsion or compression spring.

The joining member makes it possible in particular to block the orifice when the device, during normal operation, is not subjected to any pressure variation.

The joining member can also allow the movable plane element to be spaced apart toward the orifice of the fixedly held plane element when a differential pressure is exerted between the faces of the plane elements of the device. Lastly, the joining member can allow the movable plane element to be returned toward the orifice of the fixedly held plane element after the damping or even dissipation of the differential pressure exerted between the faces of the fixedly held plane element and/or the movable plane element. Said joining member can have in particular a rod surrounded by at least one torsion or compression spring held by any means.

The use of compression or torsion springs in its structure can, in the device according to the invention, make it possible not to add any overweight, or just add a small overweight, to the structure into which it is inserted. As a result of the presence of bubbling elements over its entire structure, the device of the invention can allow there to be no reduction in the effectiveness of said structure. Lastly, the device of the invention can allow easy and inexpensive implementation, in particular in already existing installations.

The device according to the invention makes it possible to damp or even dissipate any differential pressure exerted on the faces of a plane element by freeing the orifice of the fixedly held element, and does so irrespective of the falling or rising direction of the pressure variation. The movable plane element can thus, depending on the embodiment of the device of the invention:
- form a uniform plane with the fixedly held plane element when during normal operation there is no pressure differential exerted between the faces of the plane elements of the device, be lowered toward the bottom of the chamber when a falling pressure differential is exerted between the faces of the plane elements of the device and/or be raised toward the top of the chamber when a rising pressure differential is exerted between the faces of the plane elements of the device.

The fixedly held element can consist of a single plane element, as well as of a plurality of plane elements integral with one another. When the device of the invention is used in a fractionating tower, it can equip each of the trays of said tower. In this usage, the movable element of the device can then be:

an above-described "tray element" joined to a plurality of identical or different tray elements associated with one another in a same plane so as to form the fixedly held plane element, or obtained by cutting out material from a "tray element", said cut-away tray element then forming the fixedly held plane element which has at least one orifice.

In other words, the fixed element can consist of a single element which is fixed to the chamber, or of a set of elements fixed together and fixed relative to the chamber.

The movable element can be an element fixed to the fixed element or an element which can come to be fixed onto a cutaway of the fixed element.

Whatever the embodiment, the movable plane element and/or the fixedly held plane element can have any form. The form of the perimeter of the element can thus have any polygonal configuration such as a triangle, quadrangle, parallelogram, etc, or even a circular or oval configuration.

The movable plane element and/or fixedly held plane element, as well as the joining and fixing members of the device, are manufactured from any material capable of withstanding the extreme pressure, temperature and corrosion conditions of the industrial processes, such as metal materials and alloys, for example steel, stainless steel, ferritic, austenitic or martensitic stainless steel, nickel alloys, copper alloys, titanium or alternatively zirconium, or alternatively plastic or composite materials.

Said movable plane element and/or fixedly held plane element can be provided with at least one bubbling element, preferably at least one valve, capable of ensuring the circulation of at least one fluid. The movable plane element advantageously has the same density of distribution of bubbling elements as the fixedly held plane element. Thus, when the device of the invention is integrated into a tray of a fractionating column, it has the same porosity as the whole tray, this porosity being dependent on the flow rate specified when the tray and the valves were designed. As a result of this arrangement, the contact surface area between the fluids of different phases on a tray equipped with the device of the invention is not reduced.

Whatever the embodiment of the device of the invention, the displacement of the movable element is calculated depending on the design of the chamber and on its pressure and temperature characteristics. It can advantageously be provided that the movable element is displaced as soon as the rising pressure differential exerted between the faces of the fixedly held plane element and/or the movable plane element is greater than the designed flow rate of the bubbling elements or as soon as the falling pressure differential exerted between the faces of the fixedly held plane element and/or the movable plane element reaches 50% of the mechanical strength of said plane elements of the device.

The words "design" and "designed" for the chamber or tray mean that the devices are manufactured so as to allow correct or even optimum operation of the chamber or the tray in the predefined operating conditions.

The device according to one aspect of the invention can advantageously be arranged so as to free the orifice in the event of elevated pressure on a first side of the fixedly held plane element relative to a second side opposite this first side, and in the event of elevated pressure on the second side (of the fixedly held plane element) relative to the first side. The orifice can thus be freed as a result of elevated pressure on one side of the plane element but also as a result of elevated pressure on the other side of this plane element.

The device advantageously has a set of at least one movable plane element, this set comprising:

a movable plane element which can be spaced apart from the orifice toward the top of the chamber, and a movable plane element which can be spaced apart from the orifice toward the bottom of the chamber.

These two movable plane elements can be combined or separate.

In a first embodiment of the device of the invention, the joining member consists of a rigid rod passing vertically through the plane of the movable element so as to have one half situated above the movable element and the other half situated below, said rod being surrounded by at least two compression springs and having at least one of the ends connected to the fixedly held element by a fixing member.

In a second embodiment of the device of the invention, the orifice is covered by two movable elements with antagonistic movement, each movable element being made integral with the fixedly held element via a joining member consisting of a rod surrounded by at least one torsion spring and preferably two. In particular, the torsion springs are mounted so as to allow the antagonistic movement of the movable elements.

In this configuration, each joining member, in particular each rod, is made integral with the fixedly held element by means of two pairs of angle steels arranged head to tail at each of the ends of the rod. The antagonistic movement of the movable elements is enabled by the presence of the torsion springs and the pairs of angle steels, each angle steel of a same pair advantageously being mounted asymmetrically head to tail on each face of the fixedly held element. In this case, one of the movable elements can effect a rotation about a rod below the plane defined by the fixed element but cannot rise above this plane (it is locked in its upward travel), whilst the other movable element can effect a rotation about a rod above the plane defined by the fixed element but cannot be lowered above this plane (it is locked in its downward travel).

In a third embodiment of the device of the invention, the orifice is covered by a movable element, said movable element being made integral with the fixedly held element by a single common joining member consisting of a rod surrounded by at least two and preferably four torsion springs. In this configuration, the joining member, in particular the rod, is made integral with the fixedly held element by means of two angle steels arranged at each of the ends of the rod. In this case, a single plane can pivot about an axis. This results in one of the parts of the single plane rising above the plane defined by the fixed element and in another part of the single plane dropping below the plane defined by the fixed element.

According to another of its aspects, the invention also relates to the use of said device of the invention as a damper of pressure variations in a sealed chamber, such as a fractionating column and more particularly within a tray ensuring contact between two fluids forming different phases circulating in countercurrent flow. Said different phases can be a heavy liquid phase and a light liquid phase or alternatively a liquid phase and a vapor phase.

Lastly, the device of the invention can be used in any reactor fed by at least one fluid and preferably a gas.

Of course, the invention also relates to a sealed chamber comprising at least one device according to the invention.

The invention is now described with reference to the attached non-limiting drawings, in which:

FIGS. 1a to 1e show the first embodiment of the device according to the invention:

FIGS. 2 to 5 show the second embodiment of the device according to the invention:

FIGS. 6 to 8 show the third embodiment of the device according to the invention:

The devices can be used in any sealed chamber in which pressure variations, in particular sudden variations, can occur. In particular, the devices of the invention can be inserted on each of the trays of fractionating columns ensuring the contact between the liquid or gaseous fluids forming different phases and circulating in a countercurrent flow.

In a first embodiment of the device (1) of the invention, shown in FIGS. 1a to 1e, the movable plane element (3) and the orifice (10) of the fixedly held plane element (4) have a substantially identical geometry and dimensions so as to form a same common plane when during normal operation there is no pressure differential exerted between the faces of the plane elements of the device (1).

Figure 1A:
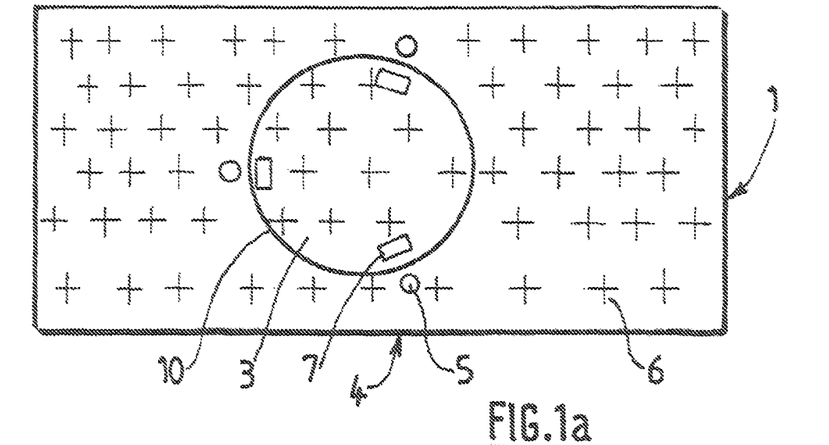
FIG. 1a shows a view from above of a device during normal operation, in other words when there is no pressure differential exerted between the faces of the fixedly held or movable plane elements. In this example, the movable element and the orifice are circular in shape.
Figure 1B:
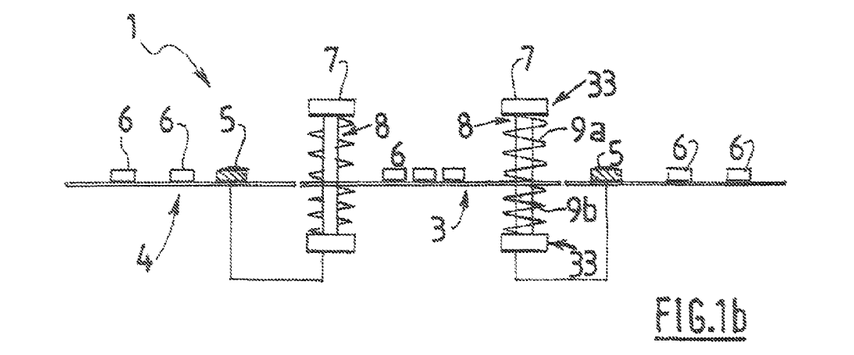
FIG. 1b shows a side view of the device during normal operation, in other words when there is no pressure differential exerted between the faces of the fixedly held or movable plane elements.
Figure 1C:
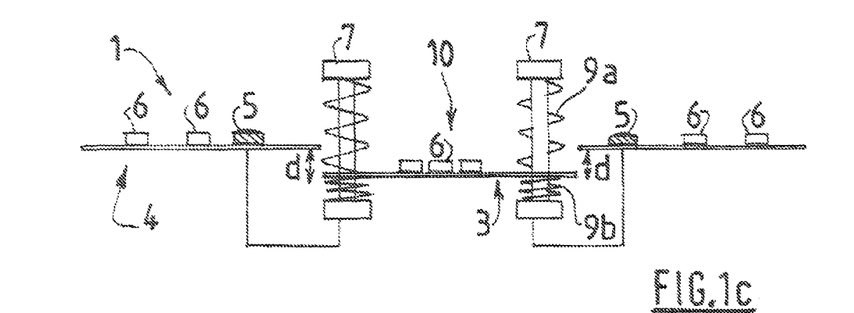
FIG. 1c shows a side view of the device when it is subjected to a falling pressure differential exerted between the faces of the fixedly held or movable plane elements.
Figure 1D:
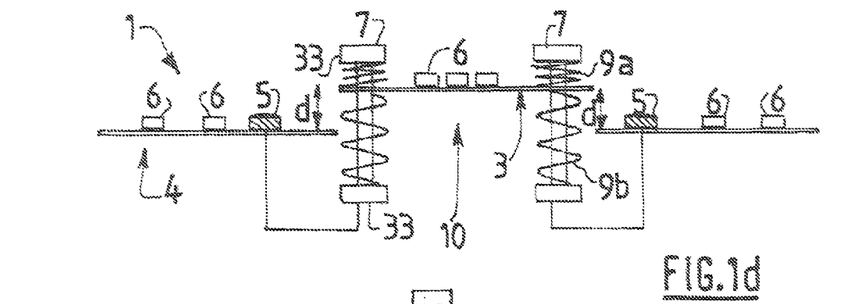
FIG. 1d shows a side view of the device when it is subjected to a rising pressure differential exerted between the faces of the fixedly held or movable plane elements.

In this first embodiment, the movable plane element (3) can be displaced above or below the plane defined by the fixedly held element (4) and its orifice (10), in other words it effects a displacement in a plane perpendicular to the plane of the fixedly held element while remaining in a plane parallel to the latter, or alternatively it effects a translational movement. With reference to the normal operating state, the movable plane element (3) can, in addition to its equilibrium position in the plane defined by the fixedly held element, adopt two other separate positions by:

being lowered relative to the plane of the fixedly held element (4) when the pressure differential falls, in other words is directed toward the bottom of the chamber, being raised relative to the plane of the fixedly held element (4) when the pressure differential rises, in other words is directed toward the top of the column.

In this first embodiment, the three separate positions of the device (1) are made possible by the specific arrangement of the joining member or members (7) which makes or make the movable element (3) integral with the fixedly held element (4).

Each rigid rod (8) forming a joining member (7) preferably passes vertically through the plane of the movable element (3) so as to have one half situated above the movable plane element (3) and the other half situated below, at least one of the ends of the rigid rod (8) being connected to the fixedly held element by a suitable fixing member (5). The rod (8) can be surrounded by at least one compression spring (9) which has the function of ensuring the spacing apart or returning of the movable plane element (3) onto the orifice (10).

Figure 1E:
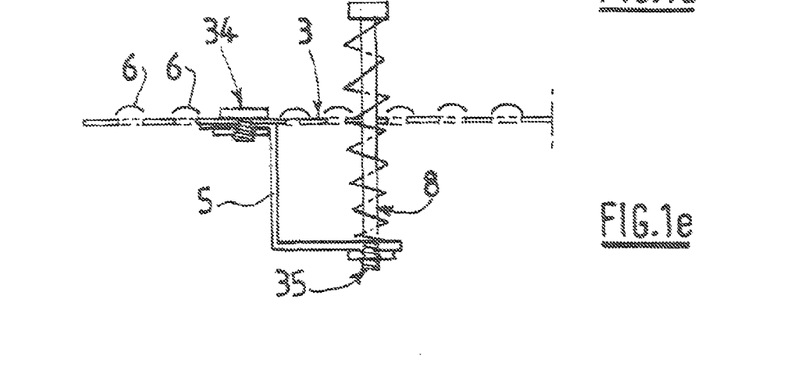
FIG. 1e shows a side view of the fixing member allowing the rod to be assembled with the fixedly held element.

The rod (8) is surrounded by two springs (9) which can have differing parameters of length, stiffness, diameters and pitch, their free length preferably being half less than that of the rod (8). In this latter case, the first spring (9a) arranged so that it bears on the upper face of the movable plane element (3) surrounds the upper half of the rod (8), whilst the second spring (9b) arranged so that it bears on the lower face of the movable plane element (3) surrounds the lower half. Each spring (9) can be held by a locking head (33) positioned at each end of the rod and/or by a suitable fixing member (5) which allows the rod (8) to be assembled with the fixedly held plane element (4), preferably in a vertical position.

The fixing member (5) advantageously consists of an angle bracket which is made integral with a part of the fixedly held element (4) by an assembly comprising a bolt and a nut (34) or by a weld. The rod (8) is threaded at least one of its ends (35) so as to be fixed by screwing and/or bolting in the angle bracket (5). The joining member (7) is preferably connected to the fixedly held plane element (4) by two fixing members (5), each end (35) of the rod (8) then being threaded, the assembly formed by the joining member (7) and the two fixing members (5) being in this way considerably strengthened.

In this embodiment, and more particularly for use of the device within a tray of a fractionating column such as, for example, a vacuum distillation column, the distance (d) by which the movable plane element (3) is spaced apart relative to the plane formed by the fixedly held element (4) and its orifice (10) must make it possible, in particular as quickly as possible, to dissipate rising or falling pressure variations and restore normal operation of the tray so as to minimize the temporary malfunction of the tray whilst maintaining its integrity.

To do this, the spacing distance (d) can be limited to twice the height of a bubbling element (6) such as a valve, or even limited to the same height. Directly linked to this parameter (d), the stiffness of the compression springs (9) used in this embodiment is selected as a function of the expected spacing distance. Because the spacing distance (d) is fixed, the damping and dissipation capacity of the device can hence vary as a function of the design of the orifice (10) and in particular of the open surface area which it presents. It is preferably calculated that the orifice (10) is freed as soon as the rising pressure differential (the pressure exerted on the lower faces of the plane elements is greater than the pressure exerted on the upper faces) exceeds the dissipation capacities of the bubbling elements (6), in particular the valves, defined by their designed flow rates.

It is preferably calculated that the orifice (10) is freed as soon as the falling pressure differential exceeds the mechanical strength (elastic deformation) of the fixedly held element (4) and the movable element (3) which form the device. It is advantageously calculated that the orifice (10) is freed as soon as the falling pressure differential exceeds 50% of the mechanical strength of the fixedly held element (4) and the movable element (3) which form the device, it being necessary for the mechanical strength to be calculated initially over the total surface of the device (fixedly held plane element and movable plane element) which is made leaktight by the closing of the elements of the valves (6).

When the movable plane element (3) and the orifice (10) are circular in shape, the device has at least two, preferably three, joining elements (7) arranged at approximately 120° to each other. In such a configuration, the stiffnesses of the springs (9) can differ but they are advantageously identical such that the movable plane element (3), when it moves away from the orifice (10), maintains a plane parallel to the plane of the fixedly held element (4).

In a second embodiment of the device (11) of the invention, shown in FIGS. 2 to 5, the movable plane elements (12) and the orifice of the fixedly held plane element (14) have substantially identical geometries and dimensions so as to form a same common plane when there is no pressure differential exerted between the faces of the plane elements of the device (11).

Figure 4:
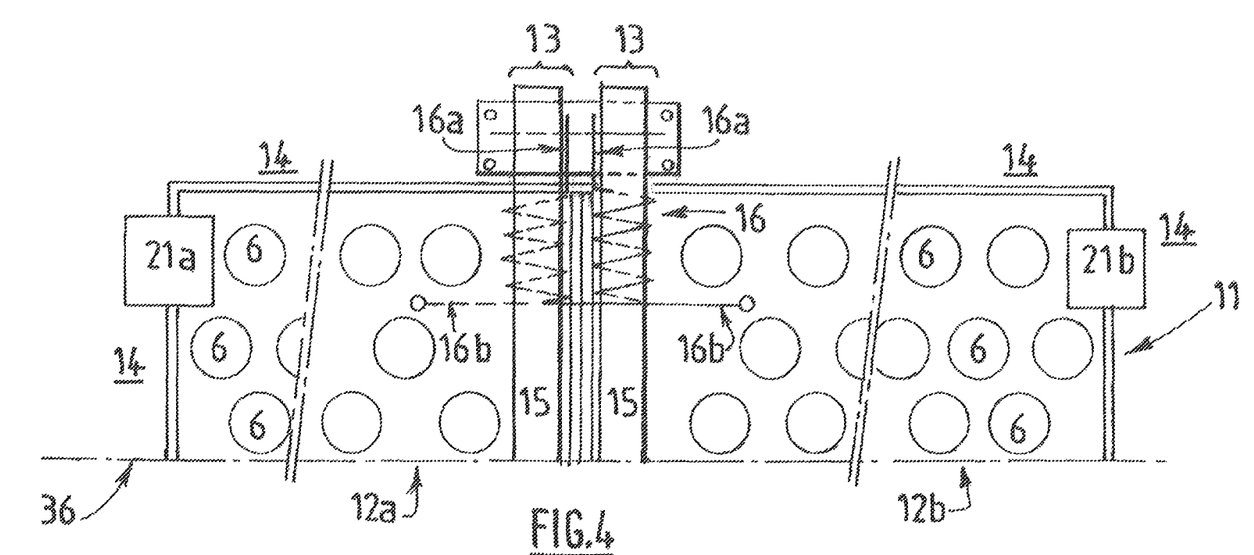
FIG. 4 shows a top view of one half of the device according to the second embodiment, the second, not visible, half being symmetrically identical to the first half relative to an axis.
Figure 5:
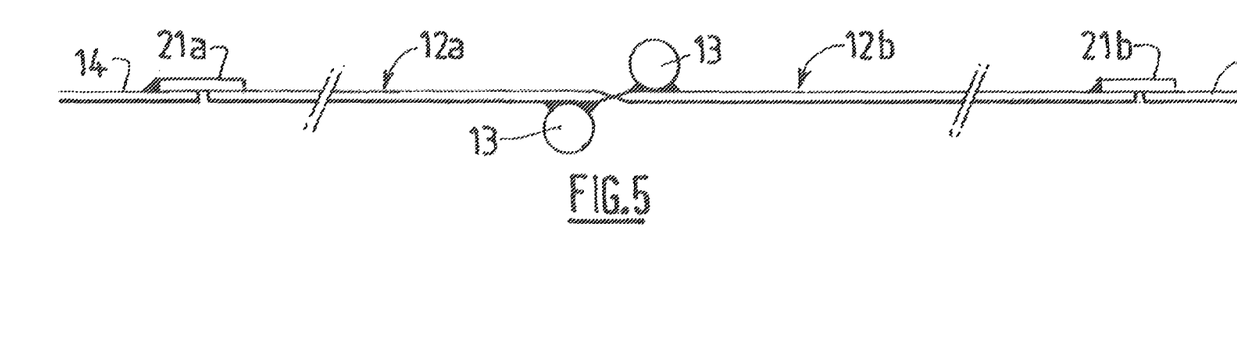
FIG. 5 shows a side view of the device according to the second embodiment.

The orifice of the fixedly held plane element (14) is entirely covered during normal operation by two identical movable plane elements (12a, 12b) arranged in the same common plane but with antagonistic movements. Under the effect of a pressure differential exerted between the faces of the fixedly held plane element (14) and/or the movable plane element (12), one of the movable plane elements (12b) can be spaced apart from the orifice toward the top of the chamber, whilst the other (12a) can be spaced apart from the orifice toward the bottom of the chamber.

Each moveable plane element (12) is made integral with the fixedly held element (14) by a joining member (13) consisting of a preferably cylindrical rod (15) surrounded by at least one torsion spring (16) which serves to space apart or return the moveable plane element (12) to the orifice.

When the rod (15) is surrounded by a single torsion spring (16), the latter is such that it has two windings of wires mounted symmetrically relative to the axis (36) and connected to each other by a single branch which is bent symmetrically at two 90° angles, said joining branch for the two windings then bearing against one of the faces of the movable element (12).

When the rod (15) is surrounded by two torsion springs (16), the latter have the same characteristics and are mounted identically, symmetrically relative to the axis (36), on the rod (15) at each of its ends. Each rod (15) then serves as an axis of pivoting of the movable element (12) which can be spaced apart from the plane of the orifice by an angle limited by the value of the maximum angle of rotation of the torsion spring. This angle by which the movable element is spaced apart can range from 0° to 180°, and preferably from 0° to 90°.

Figure 3:
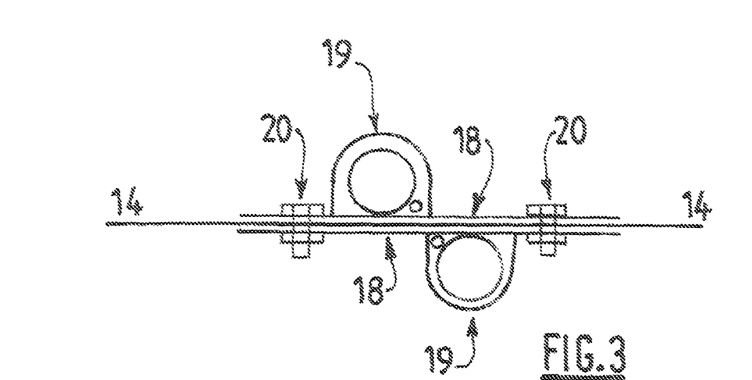
FIG. 3 shows in a side view two angle steels mounted asymmetrically head to tail on each face of the fixedly held element, each first blade surrounding the fixedly held plane element.

Each of the rods (15), joined by any means to the fixedly held plane element (14) in the median part of the orifice is totally or partially welded to the movable plane element (12). Each rod (15) is made integral with the fixedly held element by means of two pairs of angle steels (17) mounted symmetrically relative to the axis (36) at each of its ends.

Figure 2:
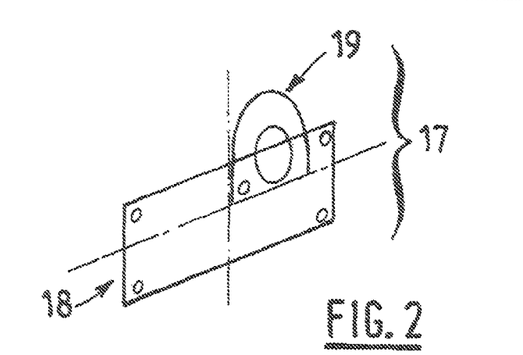
FIG. 2 shows in a three-quarter view an angle steel which is an element of the joining member which makes the movable plane element integral with the fixedly held element. Said angle steel has a first blade in a horizontal plane, integral with the fixedly held plane element and a second blade integral with the first one in a vertical plane.

Each angle steel comprises a first perforated blade (18) of any shape, preferably quadrangular, and a second blade (19) positioned at 90° to the first one and with a geometry which permits a male/female-type assembly with each rod (15). The first blade (18), perforated by at least one hole and preferably by four, is joined to the fixedly held element (14) by any means and preferably by bolting, the number of bolts (20) then being equal to the number of perforations in said first blade (18). The second blade (19) is perforated by a single orifice into which one of the branches (16a) of each torsion spring threaded over the rod (15) is introduced, the second branch (16b) of the torsion spring (16), which can also be the joining branch when the spring has two windings, bearing against the upper or lower face of its movable element (12), and this happens depending on the spacing apart movement toward the top (12b) or the bottom (12a) respectively of the chamber of said movable element in such a way that the two branches (16a and 16b) form a 90° angle.

In order to allow the antagonistic movements of the two movable elements, each pair of angle steels (17) is mounted head to tail at each end of the two rods (15), each angle steel (17) of a same pair being fixed asymmetrically on each face of the fixedly held element (14).

In order to adjust the setting and limit the faulty sealing between the two movable elements (12a, 12b), it is preferable to bevel each movable element (12) on each of the sides situated in the median part.

In order to ensure the leaktightness of the device (11), the perimeter of each movable element (12) adjacent to the fixedly held element (14) can be covered totally or partially by at least one metal piece (21) directing the displacement of the movable elements (12) toward the top or toward the bottom of the chamber.

Consequently, the piece (21b) is fixed on the movable element (12b) so as to direct its displacement solely toward the top of the chamber, whilst the piece (21a) is fixed on the fixed element (14) so as to direct the displacement of the movable element (12a) solely toward the bottom of the chamber. These pieces (21a, 21b) are preferably flat iron pieces fixed by welding.

Figures 6, 8:
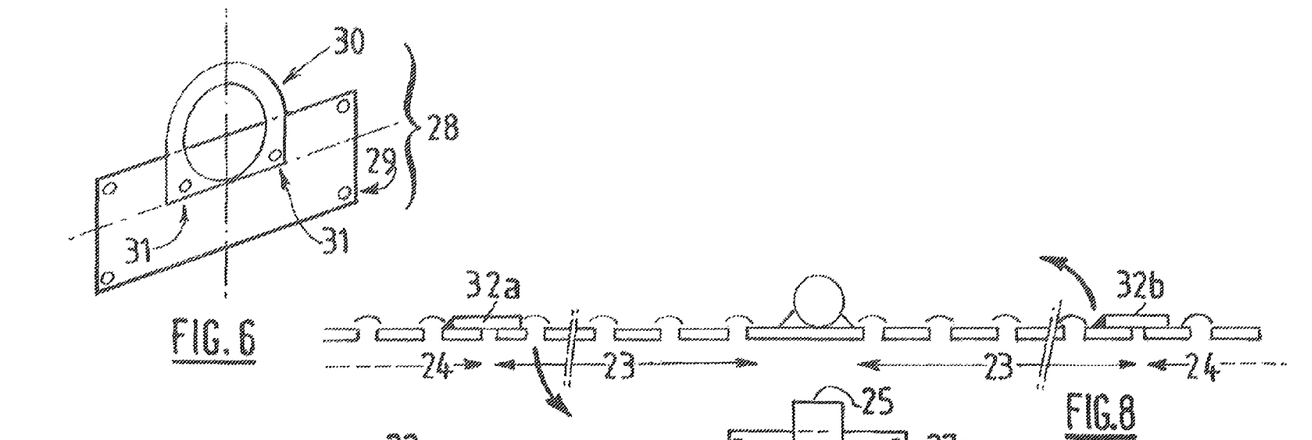
FIG. 6 shows in a three-quarter view an angle steel which is an element of the joining member which makes the movable plane element integral with the fixedly held element. Said angle steel has a first blade in a horizontal plane, integral with the fixedly held plane element and a second blade integral with the first one in a vertical plane.
FIG. 8 shows a side view of the device according to the third embodiment.
Figure 7:
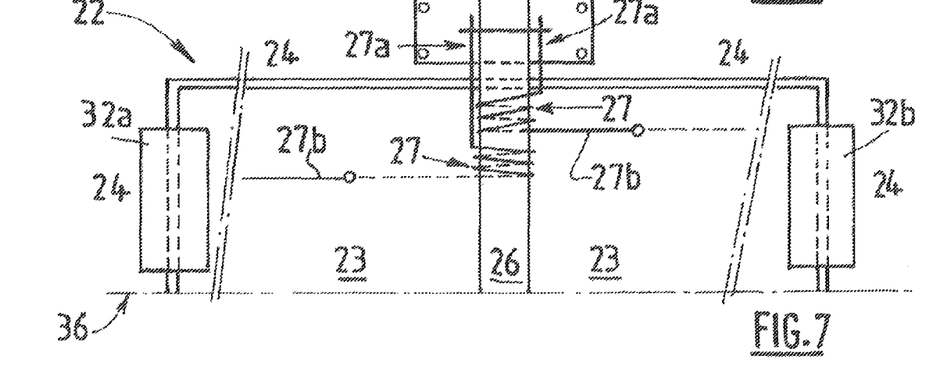
FIG. 7 shows a top view of one half of the device according to the third embodiment, the second, not visible, half being symmetrically identical to the first half relative to an axis.

In a third embodiment of the device (22) of the invention, shown in FIGS. 6 to 8, the single movable plane element (23) and the orifice of the fixedly held plane element (24) have a substantially identical geometry and dimensions so as to form a same common plane when there is no pressure differential exerted between the faces of the plane elements of the device (22).

The orifice of the fixedly held plane element (24) is covered entirely, during normal operation, by the movable plane element (23). Under the effect of a pressure differential exerted between the faces of the fixedly held plane element (24) and/or the movable plane element (23), the movable plane element (23) can be spaced apart from the orifice simultaneously by rotation in the direction of the top of the chamber and in the direction of the bottom of the chamber. The movable plane element (23) is made integral with the fixedly held element (24) by a single common joining member (25) consisting of a preferably cylindrical rod (26) surrounded by at least two and preferably four torsion springs (27) which serve to space apart the movable plane element or return it to the orifice.

When the rod (26) is surrounded by two torsion springs (27), the latter are such that they each have two windings of wires mounted symmetrically relative to the axis (36) and connected to each other by a single branch which is bent symmetrically at two 90° angles, said joining branch for the two windings then bearing against one of the faces of the movable element (23). When the rod (26) is surrounded by four torsion springs (27), the latter have the same characteristics and are mounted in an identical fashion, symmetrically relative to the axis (36), on the rod (26) at each of its ends. The torsional moments of the springs (27) are equal, calculated for the smallest opening stress of the movable element (23). The freeing of the orifice (10) is preferably calculated such that it takes place as soon as the pressure differential exceeds the mechanical strength (preferably 50% of this mechanical strength) of the fixedly held element (24) and movable element (23) which constitute the device. The rod (26) thus serves as an axis of pivoting for the movable element (23), which can be spaced apart from the plane of the orifice by an angle limited by the value of the maximum angle of rotation of the torsion springs. This angle by which the movable element (23) is spaced apart can range from 0° to 90°. Said rod (26), joined by any means to the fixedly held plane element (24) at the median part of the orifice, is partially welded to the movable plane element (23). The rod (26) is made integral with the fixedly held element (24) via two angle steels (28) arranged symmetrically relative to the axis (36) at each of its ends.

Each angle steel comprises a first perforated blade (29) of any shape, preferably quadrangular, and a second blade (30) positioned at 90° to the first and the geometry of which allows a male/female-type assembly with the rod. The first blade (29), perforated by at least one hole and preferably four, is joined to the fixedly held element (24) by any means, preferably by bolting, the number of bolts then being equal to the number of perforations in said first blade (29). The second blade (30) is perforated by two orifices (31) into each of which is introduced one of the branches (27a) of each of the torsion springs threaded over the rod, each second branch (27b) of each of the torsion springs (27) (which can also be the joining arm when the spring (27) has two windings) bearing against the upper face of the movable element (23) in one case and against the lower face of the movable element (23) in the other, and this takes place when both the rod (26) and the angle steel are fixed on the upper faces of the plane elements. The two branches (27a, 27b) of a same spring (27) form a 90° angle.

In order to make the device (22) leaktight, the perimeter of the movable element (23) adjacent to the fixedly held element (24) can be covered totally or partially by at least one metal piece (32) imparting a single direction of rotation of the movable element (23) about the rod (26). Consequently, the piece (32b) is fixed to the movable element (23) so as to direct the displacement of one of its halves toward the top of the chamber, whilst another piece (32a) is fixed to the fixed element (24) so as to direct the displacement of the other half of the movable element (23) toward the bottom of the chamber. These pieces (32a, 32b) are preferably flat iron pieces fixed by welding.

For each of the three embodiments of the device, the plane elements held fixed and the movable plane elements are equipped with bubbling elements, advantageously with valves (6).

The invention claimed is:

1. A device for damping pressure variations in a sealed chamber comprising:
   a fixedly held plane element in the sealed chamber and perforated by at least one orifice;
   at least one movable plane element arranged, during normal operation, in the same common plane as the fixedly held plane element of the chamber so as to cover the orifice of the fixedly held element, it being possible for said movable plane element to be spaced apart from the orifice toward the top or toward the bottom of the chamber, and the dimensions of said movable plane element being at least equal to those of the orifice of the fixedly held plane element;
   at least one joining member which makes the movable plane element integral with the fixedly held plane element and allows the movable plane element to be held in place, spaced apart or returned relative to the orifice of the fixedly held plane element, and said joining member has a rod surrounded by at least one torsion or compression spring; and
   said device being arranged so as to free or open the orifice in the event of elevated pressure on a first side of the fixedly held plane element relative to a second side opposite said first side, and in the event of elevated pressure on the second side of the fixedly held plane element relative to the first side.

2. The device for damping pressure variations in a sealed chamber as claimed in claim 1, wherein the fixedly held plane element is a single plane element.

3. The device for damping pressure variations in a sealed chamber as claimed in claim 1, wherein the fixedly held plane element comprises a plurality of plane elements made integral with one another.

4. The device for damping pressure variations in a sealed chamber as claimed in claim 1, wherein the fixedly held plane element and/or the movable plane element are provided with at least one bubbling element.

5. The device for damping pressure variations in a sealed chamber as claimed in claim 4, wherein the movable plane element has the same density of distribution of bubbling elements as the fixedly held plane element.

6. The device for damping pressure variations in a sealed chamber as claimed in claim 1, wherein the movable plane element is displaced as soon as the rising pressure differential exerted between the faces of the fixedly held plane element and/or the movable plane element is greater than the designed flow rate of the bubbling elements or as soon as the falling pressure differential reaches 50% of the mechanical strength of the plane elements of the device.

7. The device for damping pressure variations in a sealed chamber as claimed in claim 1, wherein the joining member comprises at least one rigid rod passing vertically through the plane of the movable plane element so as to have one half situated above the movable plane element and another half situated below, said rod being surrounded by two compression springs and having at least one of the ends connected to the fixedly held element by a fixing member.

8. The device for damping pressure variations in a sealed chamber as claimed in claim 1, wherein the orifice is covered by two movable plane elements, each movable plane element being made integral with the fixedly held element by a joining member comprising a rod surrounded by at least one torsion spring.

9. The device for damping pressure variations in a sealed chamber as claimed in claim 8, wherein the at least one torsion spring is mounted so as to allow the antagonistic movement of the movable plane elements.

10. The device for damping pressure variations in a sealed chamber as claimed in claim 1, wherein the orifice is covered by a movable plane element, said movable plane element being made integral with the fixedly held element by a single joining member comprising a rod surrounded by at least two torsion springs.

11. A method of damping pressure variations in a sealed chamber, comprising the use of the device as claimed in claim 1 as a pressure damper.

12. The method as claimed in claim 11, wherein the device is inserted within a tray which ensures contact between two fluids forming different phases circulating in countercurrent flow.

13. The method as claimed in claim 12, wherein the different phases are a heavy liquid phase and a light liquid phase.

14. The method as claimed in claim 12, wherein the different phases are a liquid phase and a vapor phase.

15. The method as claimed in any claim 11, in which the device is placed in a fractionating column or in a reactor fed by at least one fluid.

16. The device for damping pressure variations in a sealed chamber as claimed in claim 1, wherein the dimensions of said movable plane element are equal to those of the orifice of the fixedly held element.

17. The device for damping pressure variations in a sealed chamber as claimed in claim 4, wherein the bubbling element is a valve.

18. The device for damping pressure variations in a sealed chamber as claimed in claim 8, wherein the joining member comprises a rod surrounded by two torsion springs.

19. The device for damping pressure variations in a sealed chamber as claimed in claim 10, wherein the single joining member comprises a rod surrounded by four torsion springs.

* * * * *